Figure 14:
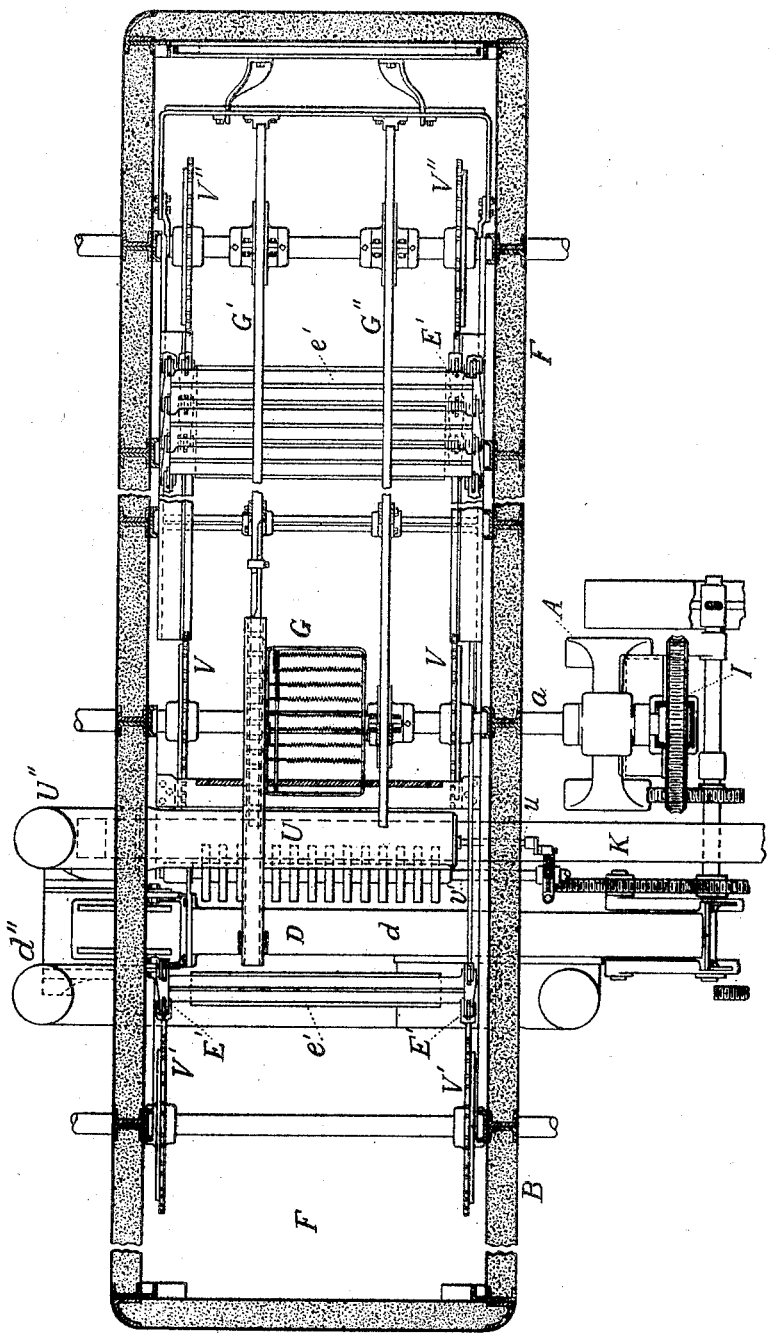

No. 797,604. PATENTED AUG. 22, 1905.
H. D. PERKY.
MACHINE FOR PREPARING FOOD.
APPLICATION FILED DEC. 10, 1900.
9 SHEETS—SHEET 1.
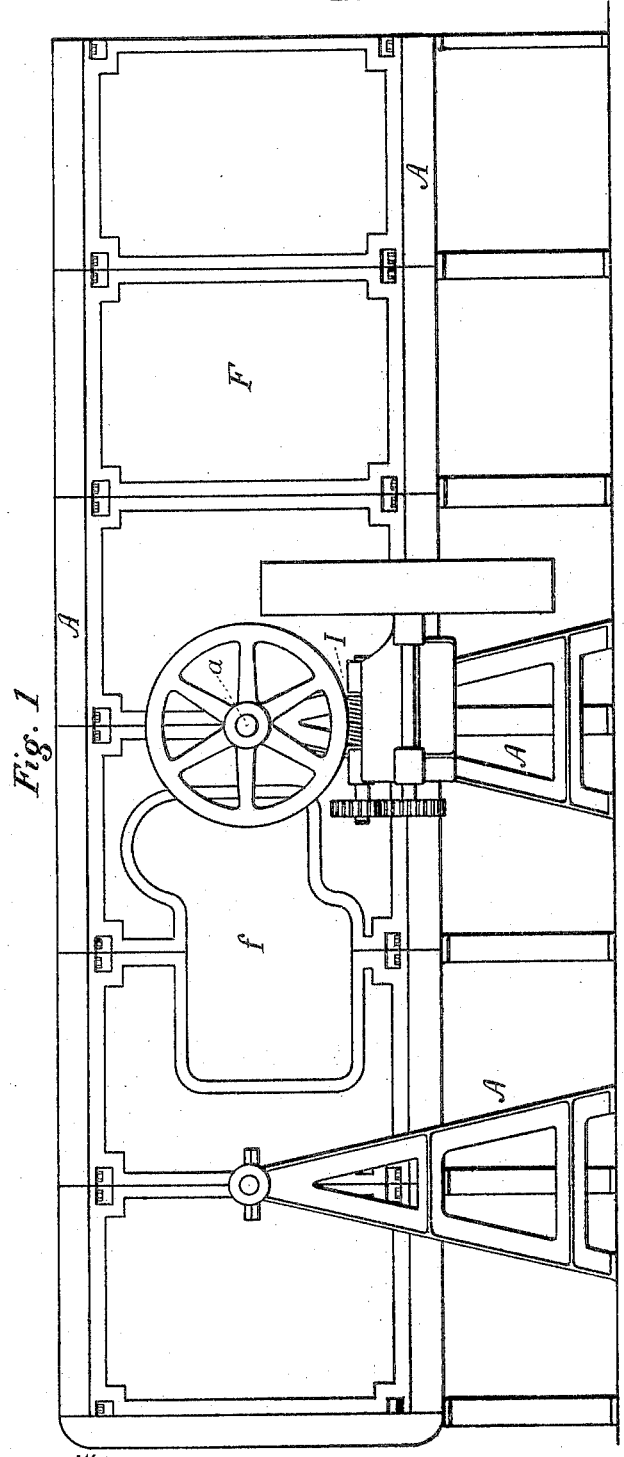
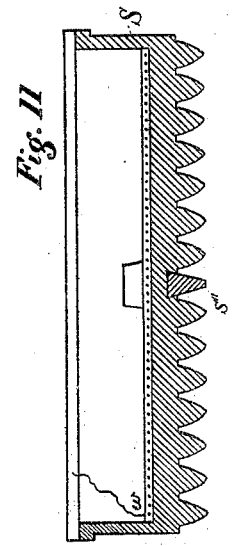
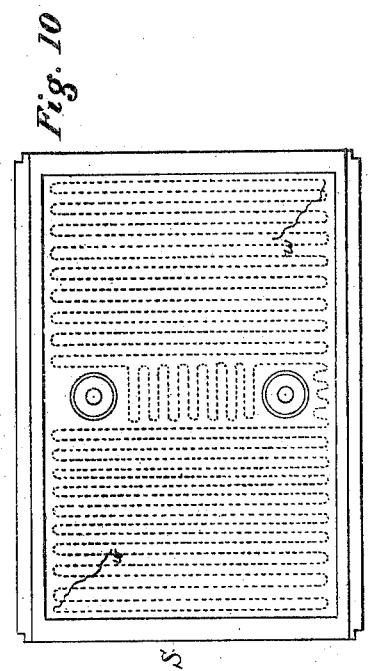
Witnesses
Inventor
Henry D. Perky
by E. W. Anderson
his Attorney

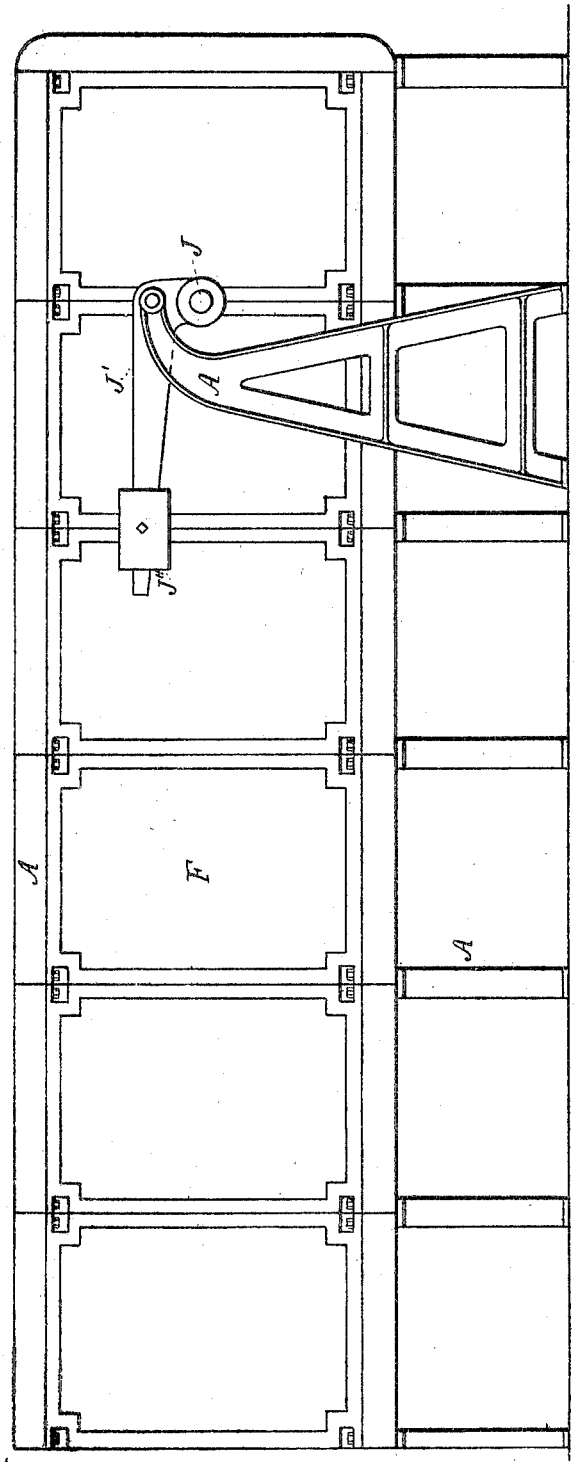

No. 797,604. PATENTED AUG. 22, 1905.
H. D. PERKY.
MACHINE FOR PREPARING FOOD.
APPLICATION FILED DEC. 10, 1900.
9 SHEETS—SHEET 3.
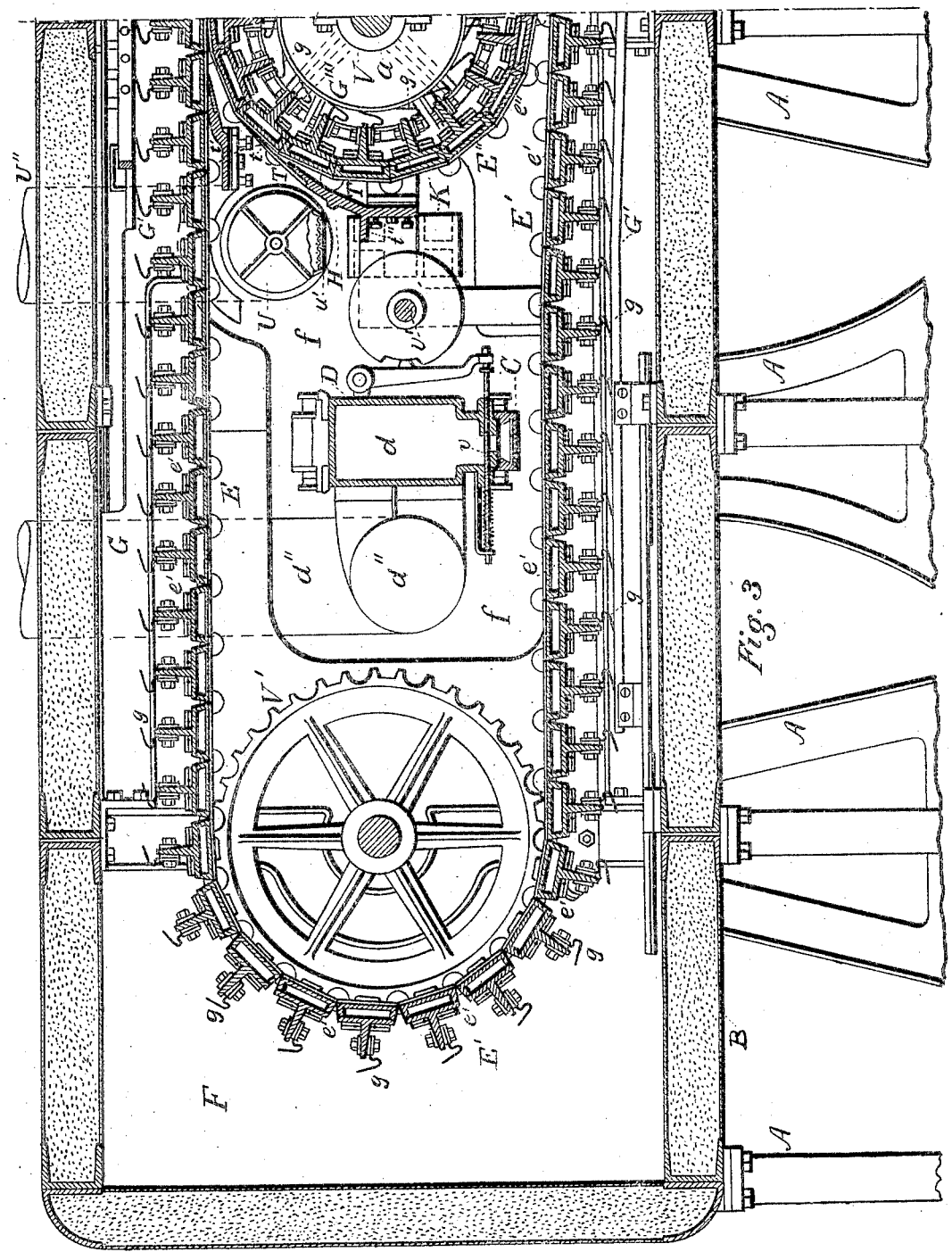
Witnesses
G. H. Hosmer.
C. N. Newcomb.
Inventor
Henry D. Perky.
by E. W. Anderson.
his Attorney

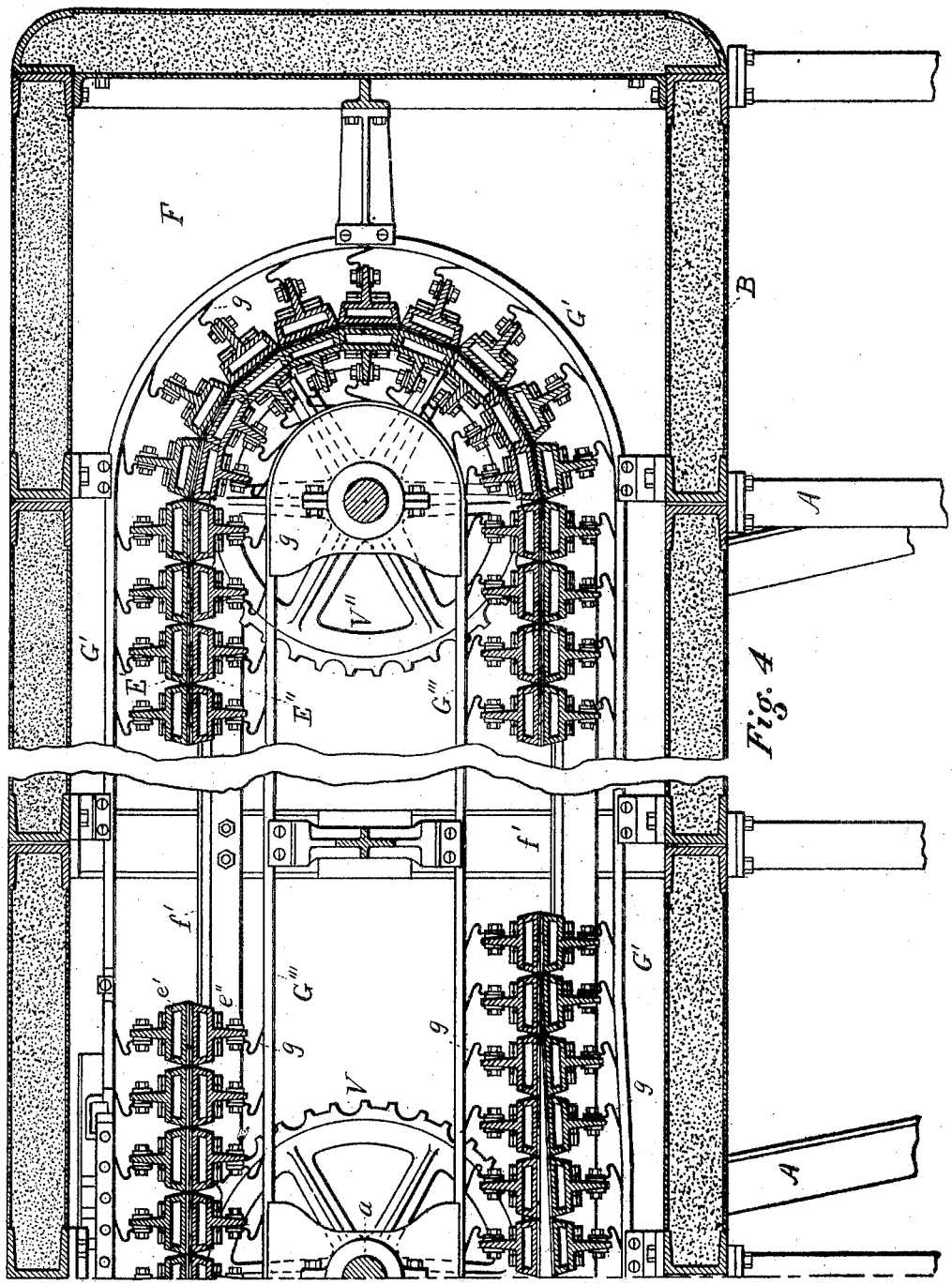

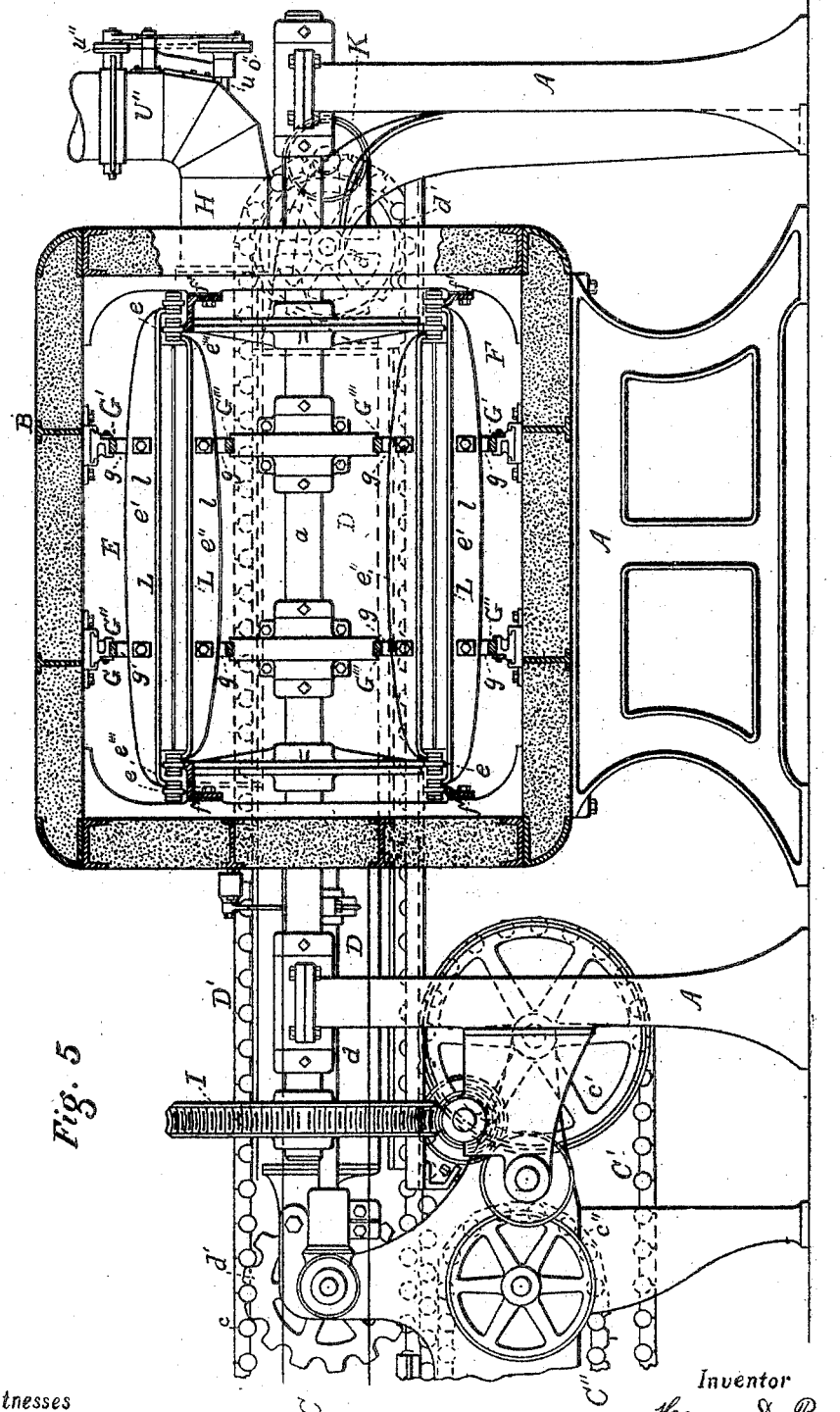

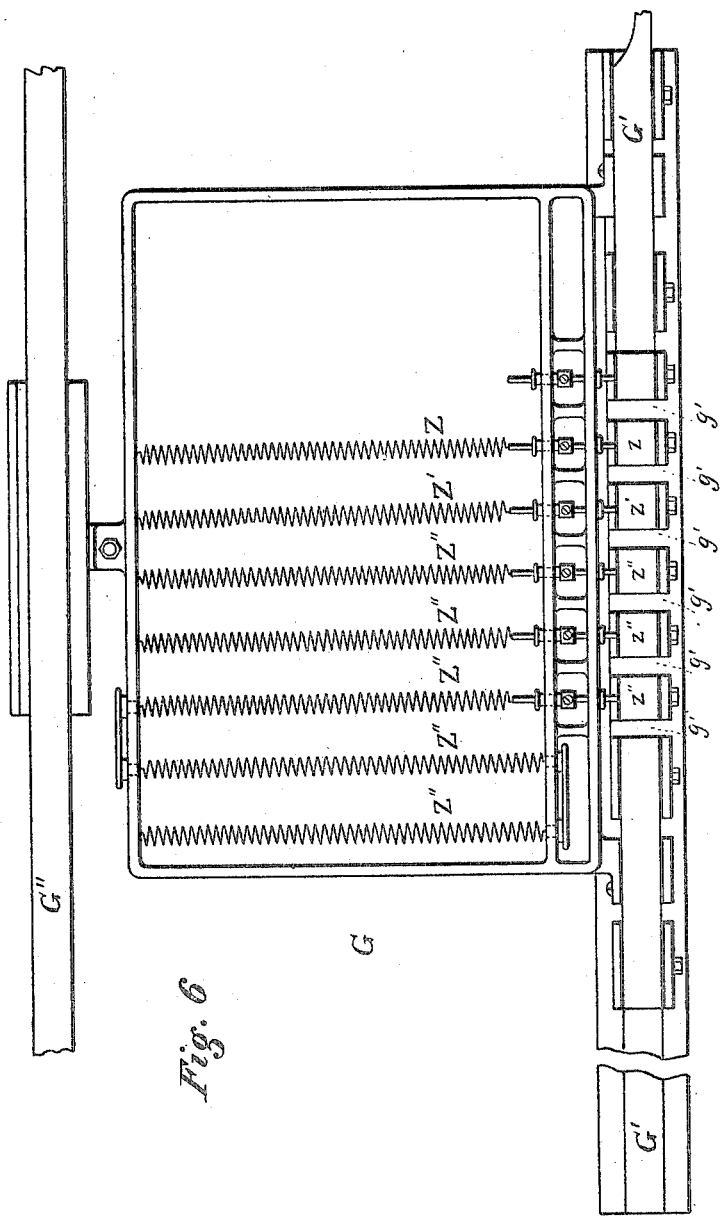

No. 797,604. PATENTED AUG. 22, 1905.
H. D. PERKY.
MACHINE FOR PREPARING FOOD.
APPLICATION FILED DEC. 10, 1900.
9 SHEETS—SHEET 7.
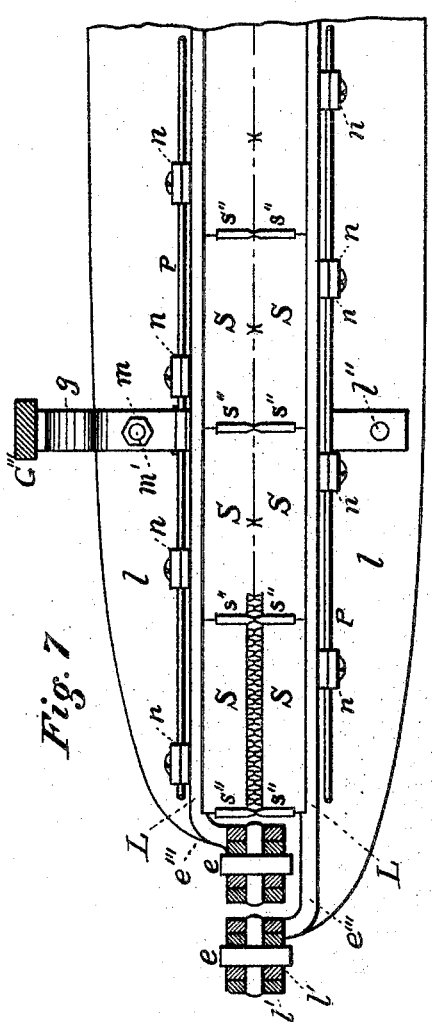
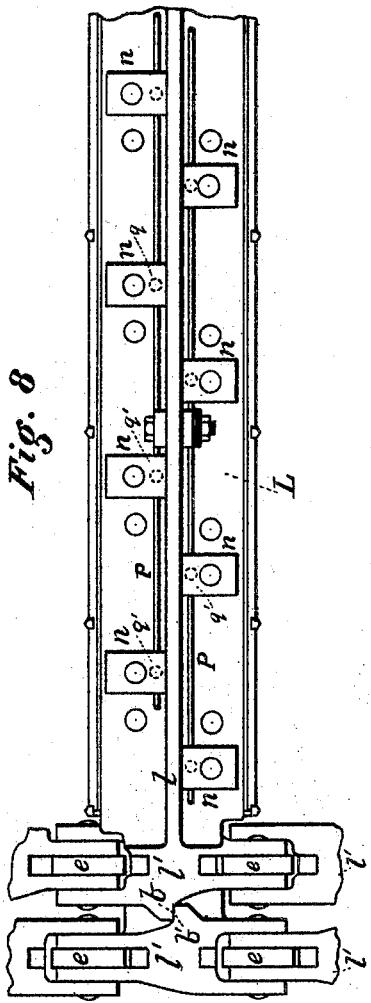
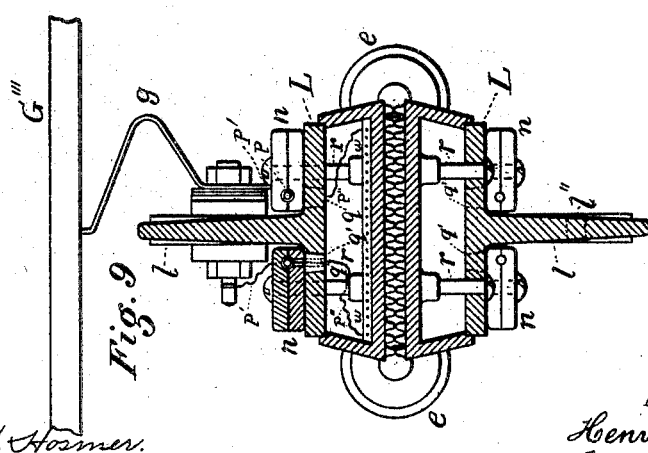
Witnesses
G. H. Hosmer.
C. N. Newcomb.
Inventor
Henry D. Perky
by E. W. Anderson
his Attorney

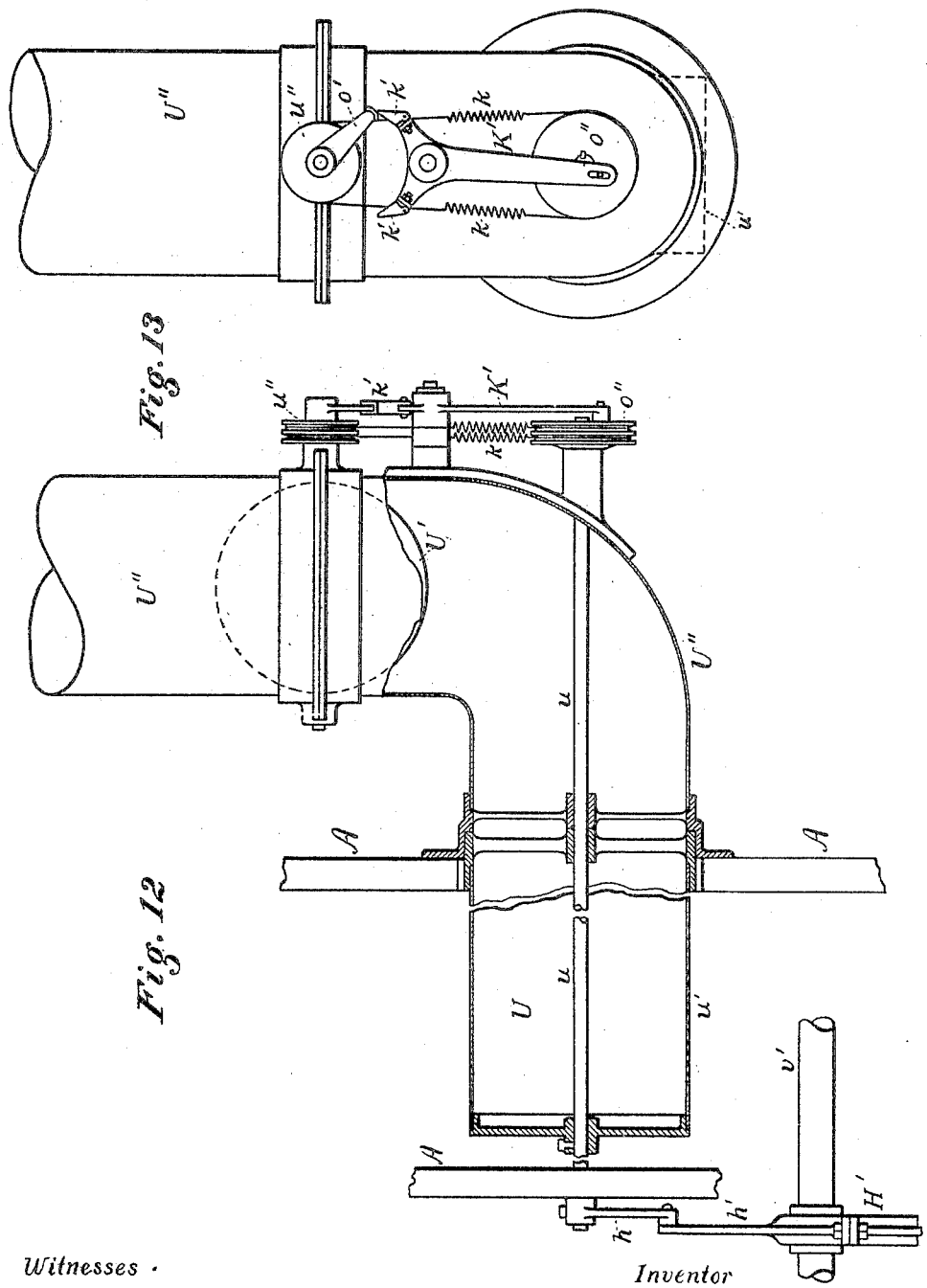

No. 797,604. PATENTED AUG. 22, 1905.
H. D. PERKY.
MACHINE FOR PREPARING FOOD.
APPLICATION FILED DEC. 10, 1900.

9 SHEETS—SHEET 9.

Witnesses
George H. Hosmer.
George M. Anderson

Inventor
Henry D. Perky.
by E. W. Anderson.
his Attorney.

UNITED STATES PATENT OFFICE.

HENRY D. PERKY, OF WORCESTER, MASSACHUSETTS, ASSIGNOR TO THE NATURAL FOOD COMPANY, OF NIAGARA FALLS, NEW YORK, A CORPORATION OF NEW YORK.

MACHINE FOR PREPARING FOOD.

No. 797,604.      Specification of Letters Patent.      Patented Aug. 22, 1905.

Application filed December 10, 1900. Serial No. 39,385.

*To all whom it may concern:*

Be it known that I, HENRY D. PERKY, a citizen of the United States, and a resident of Worcester, in the county of Worcester and State of Massachusetts, have made a certain new and useful Invention in Machines for Preparing Food; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side view of one end portion of the oven, showing the feed-opening. Fig. 2 is a side view of the other end portion of the oven. Fig. 3 is a longitudinal section through the portion of the oven in which the feed is located. Fig. 4 is a longitudinal section through the extended portion of the oven in which the heat is mainly applied. Fig. 5 is a transverse section through the feed-opening. Fig. 6 is a plan view of the electric cut-off. Fig. 7 is a back view of one of the heaters or stove-sections, comprising a receiving stove-link and a covering stove-link, partly shown. Fig. 8 is a plan view of the end portions of the link-plates, showing the engagement thereof. Fig. 9 is a transverse section of a stove-section, comprising a receiving stove-link and a covering stove-link. Fig. 10 is a plan view showing the inside of a stove and its wiring. Fig. 11 is a longitudinal section of the same. Fig. 12 is a sectional view of a pneumatic transfer for the discharge. Fig. 13 is an end view of the same. Fig. 14 is a sectional plan view showing the features of the baking mechanism and pneumatic feed.

The object of the invention is to provide means for preparing from grain or other material in a continuous and rapid manner and in large quantities biscuit, crackers, and other articles of food; and the invention consists in the novel construction and combinations of devices, as hereinafter set forth.

In explaining the invention I have designed to set forth more particularly its application to the preparation of food from grain, having especial relation to the fibered, filamentous, or shredded form of the reduced grain; but it will be apparent that by varying the faces of the stoves in an appropriate manner the invention may be more generally applied. So, also, I have described a mode of heating the stoves by electricity, as it is preferred; but other means of heating may be used.

In the accompanying drawings the letter A designates framework, usually of iron. B represents the oven wall or casing. C indicates a continuous feed; D, a pneumatic transfer for the feed; E, the continuous baking devices; F, the oven, which is of elongated form; G, the heating devices; H, a transfer device for the discharge; K, the conveyer or discharge for the baked biscuit or crackers.

The reducing devices may be of any known character; but I usually employ a series of grooved reducing-rolls, which shred the grain or crush it into fibrous or filamentous form, as described in Letters Patent No. 571,284, dated November 10, 1896.

The material is received upon the continuous trough-chain $C'$, which is composed of trough-links, which move upon guideways or track-bars, said chain being carried by sprocket-wheels, of which the inner one is indicated at $c'$.

$C''$ represents the lower chain of cutter-links, and $D'$ the upper chain of cutter-links, which are also suction-links, being open through or provided with a passage for the application of air-pressure. The lower chain of cutter-links is carried by sprocket-wheels, as indicated at $c''$. The upper chain of suction-links is also carried by sprocket-wheels, (indicated at $d'$.) The upper chain $D'$ and the lower chain $C''$ are provided with cutter blades or knives $c$, which are arranged at intervals corresponding to the length of a chain section or width of the baking-band. Suitable trackways are provided in the framing for the links of the chains $D'$ and $C''$.

The wall of the oven is suitably packed or lined with asbestos or other non-conductor of heat. The oven is of elongated form and, as shown in the drawings, extends at right angles to the direction of the feed. It is provided with an opening at $f$ in the side near one end for the passage of the end of the feeding-chain $D'$ of suction-links, this constituting with the chain of trough-links a continuous feed, whereby the material is brought into the oven over the baking irons or stoves. As the trough-chain does not extend into the oven, a pneumatic device is provided to hold the material to the open or suction links, which are faced with wire-cloth, until it reaches position over the stoves or baking-irons. The pneumatic device consists of an air-chamber $d$, to which is connected a suction-fan or exhaust by means of a pipe $d''$. The air-chamber is provided along its lower or mouth portion with a valve, or preferably with valves, $v$, which are operated by cam devices on a shaft $v'$ to apply the air-pressure progressively as a section of the material is moving into position, when the cam devices operate simultaneously to close the valves in order to effect its deposit on the stove-link. For a further description of the feed and pneumatic transfer devices reference may be had to Letters Patent No. 681,656, dated August 27, 1901, in which I have explained the construction more at length.

The oven F, as hereinbefore mentioned, extends at right angles to the direction of the feed, the lateral opening $f$ for which is much nearer one end of the oven than it is the other. At one end of the oven are provided sprocket-wheels $V'$ for the endless outer baking band or chain $E'$ of receiving stove-links $e'$, and at the other end of the oven are the sprocket-wheels $V''$ for the inner baking-chain $E''$ of covering stove-links $e''$. Near and at one side of the opening $f$ is provided a drive-shaft, carrying sprocket-wheels V for the inner end of said baking-band or covering-chain $E''$. In this construction, therefore, one of the baking-chains runs inside the other chain, which is longer than the first or inner chain and is uncovered in that portion of the oven where the feed is located, thereby forming an extension-loop for the inside feed or discharge. The covering stove-links are brought down into position on the receiving stove-links of the larger chain by the wheels V at one side of the feed. From this point the inner and outer stove-links continue together to the end of the oven and back to position at the side of the feed, where the discharge of the baked biscuit or crackers takes place.

Each chain consists of stove-links which are pivoted to each other, the pivotal axis or axis of bend of adjacent links being coincident or in line with the adjacent or meeting edges of the working or baking faces of the stoves and in the plane of such baking-faces.

The outer or receiving stove-link $e'$ and the inner or covering stove-link $e''$ constitute a stove-section, the parts of which must have an accurate fit in the movements, and to this end one chain, preferably the inner chain, is that which engages the sprocket-wheels of the driving-shaft $a$, while the outer chain is driven by the engagement of its links with those of the inner or driving chain. For this purpose each link of the inner chain is formed with arc-shaped shoulders or projections $b$ to engage correspondingly-curved shoulders or projections $b'$ of the outer stove-link. The stove-section thus formed of a receiving or outer stove-link and a covering or inner stove-link is made of proper length to take in a section of biscuit or cracker material as deposited by the feed. The outer and inner stove-links are each provided with antifriction-rollers (indicated at $e$) which run on suitable tracks or ways $f'$ of the oven. As these links are designed to have the same pitch-line, their tracks are arranged side by side and their body portions are formed with bent or angular arms $e'''$, the bearings or rollers of which are axially flush with the faces of the stoves and axially in line with the edges of such faces, interference being avoided by making the arms of one link longer than those of the other. In order to allow for expansion and contraction of the outer chain, each link is provided with a slightly elongated or enlarged opening for the connecting-pin. This construction keeps the working or baking faces of adjacent stoves together at their pivotal edges in moving around the curves, so that the tendency to rupture the material carried thereby is reduced to a minimum. The pivotal axis of the stoves lie in the baking-plane or plane of the baking-faces.

At one end of the oven an automatic take-up or tension is provided for the chain of stove-sections. This consists of a swinging shaft J, carrying the end sprocket-wheels $V''$ and being journaled in bearings in the vertical arms of the angle-levers $J'$, whose horizontal arms are provided with adjustable weights $J''$. The movement of the baking-chain is slow and is communicated by means of a worm and a worm-wheel, as indicated at I.

The oven and stoves are preferably heated by means of electricity. To this end, the oven is provided with outer parallel bus-bars or contact-bars $G'$ $G''$ and with inner parallel contact-bars $G'''$. These contact conductor-bars are laterally arranged and parallel and are connected at convenient points to the source of supply. The contact-bars are also parallel to the baking-chains, and on one side the bars may be regarded as positive, the bars on the other side being negative.

It is designed that each stove or baking-iron shall take its heating charge independently in order to facilitate the replacement and repair of parts without undue interference with the baking operation of the machine. Contact is made with these bus-bars by means of the spring-brushes $g$, which are so bent or formed that their contact ends will be in the middle or radial plane of each stove-link, this being the most accurate and economical construction for running the curves of the bus-bars. Usually the contact-brush is formed of two leaves, one extending a little beyond the end of the other, so that the breaks made in the current at the cut-off intervals $g'\,g'$ of the contact-bar G will not be so pronounced as to cause injurious sparking.

The contact-bars G' and G'' for the outer chain of the stove-links are not usually extended around the feed end of the oven, as it is designed to cut off the electric action in this portion of the chain, where a baking heat is not needed. The contact-bars G''' for the inner chain are, however, continuous, and this chain is for nearly its entire length in baking position.

To reduce the electric action in the stove-links gradually and finally cut it off, a series of gradually-increasing resistances Z Z' Z'' is employed between the body portion of the contact-bar G' and its several separated portions or contact-sections $z\,z'\,z''$, which are separated from each other and from the main bar by the intervals or breaks $g'$. As the brushes of the stove-links pass over this portion the current, taken off gradually by the several resistances in succession, will be dropped in each stove-link by degrees and finally to zero.

The outer and inner stove-links may be similar to each other, the longer roller-carrying arms of one link, however, extending beyond or encompassing the roller-carrying arms of the other link. Each link consists, according to the construction illustrated, of an elongated body portion or plate L, having a middle projection or rib $l$ extending along its back, the plane of such projections or rib being radial with reference to its movement around the sprocket-wheels. The end arms or extensions of the rib are expanded to form the link connections, as at $l'$. In proper position with relation to each contact-bar is provided in the rib an opening or perforation $l''$, in which is seated a non-conducting bushing $m$, which is secured in position by and forms a bearing for the short conductor bolt or pin $m'$, whereby the spring-brush $g$ is also secured in position.

To the body-plate at each side of the rib $l$ are connected detachable insulation strips or blocks $n$, preferably of porcelain, between which are seated the conducting-wires $p\,p$ of the link, one wire serving for the entrance of the current and the other for its exit, or the wires will serve in connection with the alternating current. These wires are connected to their respective brushes $g\,g$ by small flexible wires $p'\,p'$, and from these same wires $p'\,p'$, respectively, small terminal wires $p''\,p''$ pass to the stove-wirings $w$ of each stove or baking-iron through the lava plugs $q$, which are tapering in form and are seated in beveled openings $q'$ in the body-plates at the sides of the middle rib, these plugs being held in position by the porcelain strips $n$ when used.

The detachable stoves or baking-irons S are arranged in series along the body-plates transversely to the line of movement of the chain. Each stove consists of a rectangular casting, usually hollow or recessed in its outer portion or back, but having its inner or baking face formed to correspond with that of its fellow stove. The preferred construction is to form the baking-face with a surface distribution of pointed studs or projections designed to penetrate the material being cooked and carry the heat into deeper portions. These stoves or baking-irons are provided with dividing plates or knives, (indicated at $s''$,) which serve to indent or separate the material deposited on the stove-link into parts of convenient size to form crackers or biscuit.

The side walls or flanges of the inner stoves are of inclined formation or beveled, so that they will conform to each other in passing round the sprocket-wheels. On the floor or back of the baking-wall of the recess or chamber of the stove is laid insulating material or insulating-paint, on which is placed the distribution of fine wiring $w$ required for the heating, this wiring being covered in by another layer of insulating material or paint. When each stove-wiring is independently connected or connected in parallel with the other stove-wirings to the link conductors $p\,p$, each stove is arranged for independent heating and may be detached without interfering with the other stoves. The recesses of the stoves are covered in with the link plate or body, to which the stoves are secured by means of short bolts or connections $r$, and in this manner the interior delicate wiring and insulation are effectually protected and additional insulation of air is provided.

To arrange for the clearance and discharge of the crackers or other product after baking, a lateral opening in the oven-wall is arranged near the location of the feed-opening, or the feed-opening $f$ may be made of sufficient size to accommodate the end of the conveyer K, which extends from this location of its receiving end within the oven outward therefrom in a direction at right angles to the length of said oven. Leading to this conveyer is a guide or slide way T, which extends in an inclined or curved manner downward and from the faces of the stoves of the inner or shorter baking-chains as they pass around the upper parts of the inner sprocket-wheels. This guide or slide way is provided with an adjustable comb or clearing device T', having for use in connection with a studded baking-iron, such as has been before described, fingers $t$, designed to enter between the teeth or projections of the faces of the stoves. By such means as the stoves move around the wheel the biscuit or crackers will be loosened and guided off the stoves to the slideway, on which they will descend to a stop rib or flange $t''$.

Above the clearing device or comb T' is provided another clearer $t'$, which is designed to loosen the biscuit or crackers which may adhere to the stoves of the longer or outer chain and cause the same to fall upon the slideway T, above referred to.

The lower portion of the slideway T is located above and at the sides of the conveyer, and both are arranged at about the same radial distance from a shaft $u$, which carries a suction-head U, having a wire-cloth-covered mouth $u'$. This suction-head is connected to an air-exhaust by means of a curved pipe or otherwise. Suitable mechanism is employed to give this suction-head vibratory motion, its movement being quadrantal or through an arc of about seventy degrees. When it is turned toward the slideway T, the suction causes the crackers to adhere to the wire-cloth-covered mouth, whereby on the reverse movement of the head the crackers are carried over the conveyer, whereon they are dropped as the air-valve of the suction or exhaust is closed. In the drawings the exhaust-pipe is indicated at $U''$, the end of the suction-head U bearing in the end of said pipe, the latter carrying the cut-off valve or damper $U'$, whose journal is provided with a pulley $u''$. On the end of the suction-head shaft is provided a crank-arm $h$, which is connected by a pitman $h'$ with an eccentric $H'$ on the shaft $u'$, the rotation of which causes a proper vibration of the suction-head. To move the air-valve or damper $U'$, springs $k$ $k$ may be employed in connection with the cross-head or wheel $u''$, which is provided with an arm or catch $o'$ to engage the trip and holding lever $K'$, which is vibrated by means of a wheel $o''$ on the suction-head shaft $u$. The lever $K'$ has the trip-arms $k'$ $k'$, which respectively engage the catch of the damper, according to the position in which it is thrown by the springs to open or close the air-pipe—that is to say, when the damper is opened the exhaust is on and the suction-mouth applied to the material on the slideway T. The damper is held in this position by engagement with one of the arms $k'$ of the trip-lever. As the suction-head moves back over the conveyer the trip-lever is gradually moved until the damper is released from the trip-arm which held it and is suddenly closed by the spring tension, this movement also serving to effect the engagement of the damper-catch with the other trip-arm of the lever $K'$. The damper is opened in a similar way by the reverse movement of the trip-lever. In order to protect the stove-wirings from injury through short-circuiting or from other accidental increase of current, fuses are provided in the conductors $p'$ $p'$, leading to the brushes, such fuses consisting usually of sections of fine copper wire, or the conductor-wire $p'$ may constitute the fuse.

The pneumatic transfer to take the articles from the baking-chain links and deposit them on the conveyer-belt may be dispensed with when the baked biscuit or sections are crisp, because they will then readily slide down the guideway to the belt. In this case the slideway T is constructed without ledges to stop the biscuit or crackers.

It is not designed to confine this invention to the construction shown and described, as the stoves and other portions of the mechanism may be varied in ways known to those skilled in the art without departing from the principles involved.

What I claim as my invention, and desire to secure by Letters Patent, is—

1. A machine for preparing food consisting of a series of moving baking-stoves, conduction devices attached to each stove, independent conductors in connection with the conduction devices of each stove, and an electric-supply conductor common to such independent conductors, substantially as specified.

2. In a machine for preparing food, the combination with an endless series of moving baking-stoves, of conduction devices attached to each stove, moving conductors for supplying said conduction devices with electricity, and a fixed conductor common to said moving conductors, substantially as specified.

3. The combination with a body-plate, of a series of detachable stoves or baking-irons, cutting-plates, and means of attachment of said stoves and plates to said body-plates, substantially as specified.

4. An endless chain of link-plates, pivoted to each other, and a transverse series of detachable stoves or baking-irons, attached to each link-plate, substantially as specified.

5. The combination with an inner chain of stove-links, of an outer chain of stove-links engaging said inner chain, and extending beyond the same to form a reception-loop for the feed and discharge, substantially as specified.

6. The combination with an endless covering baking-chain, of a longer endless receiving baking-chain having an extension for the feed beyond the shorter covering baking-chain, substantially as specified.

7. The combination with an endless inner baking-band, of an endless outer baking-band, having an extension beyond said inner baking-band for the feed, substantially as specified.

8. A stove-link plate having a back rib or projection extending lengthwise, and provided with expanded link-connection-bearing arms at its ends, substantially as specified.

9. The combination with side-by-side trackways of a receiving stove-plate and a covering stove-plate having bearing-arms of unequal length for such trackways, substantially as specified.

10. A link-plate having a series of detachable stoves connected thereto, and provided at its ends with link connections, and bearings axially flush with the faces of said stoves, substantially as specified.

11. The combination with an elongated link-plate of a series of independent detachable stoves attached to said plate, and independent wiring for electric heating connected to each stove, substantially as specified.

12. An elongated heater-plate, having a back rib or projections carrying insulated conductors, insulated conductors extending along said plate, detachable stoves, connected to said plate, insulated wiring for said stoves, and conductor-wires extending from said wiring to the conductors extending along said plate, substantially as specified.

13. An elongated plate, having a back rib or projection, insulated conductors attached thereto, detachable insulation on each side of said rib or projection, conductors carried by such detachable insulation, stoves connected to the plate, insulated wiring on said stoves, and independent connecting-wires from such wiring to the conductors carried by said detachable insulation, substantially as specified.

14. In a machine for preparing food, the combination with a driving-wheel, and an endless driving-chain of baking-stoves engaging said driving-wheel, an endless driven chain of opposite baking-stoves, and means of engagement between the opposite stove-links of the driven chain, and driving-chain, substantially as specified.

15. In a continuous baking-machine, the combination with an endless outer or receiving chain of stove-links, of an endless inner or covering chain, of stove-links, sprocket-wheels, and automatic devices to allow for the expansion and contraction of such chains, substantially as specified.

16. In a continuous baking-machine, the combination with the endless outer or receiving chain of stove-links, and the sprocket-wheels, of the endless inner or covering chain of stove-links, and engaging devices of the latter, whereby the outer or receiving chain of stove-links is driven, substantially as specified.

17. The combination with a continuous pneumatic feed of a continuous baking device extending at right angles to the line of movement of such feed, substantially as specified.

18. The combination with an endless baking-band of a continuous pneumatic feed, substantially as specified.

19. The combination with an elongated oven, having a lateral opening for the feed, and trackways, of an endless outer receiving baking-band, a shorter endless inner or covering baking-band, and means for heating, substantially as specified.

20. The combination with an elongated oven, having an opening for the feed and trackways, of a long endless outer or receiving chain of stove-links, a shorter endless inner or covering chain of stove-links, and means for heating, substantially as specified.

21. The combination with an oven, having a lateral opening for the feed, and side-by-side trackways, of a long endless outer chain of stove-links, and a shorter endless chain of stove-links, having the same pitch-line, sprocket-wheels for such chains, and means for heating, substantially as specified.

22. The combination with an elongated oven, having a feed-opening, of a feed and a discharge at right angles to the length of the oven, a clearing-slideway, an endless outer or receiving baking-chain, a shorter endless inner or covering baking-chain, and trackways for said chains, substantially as specified.

23. The combination with a long endless outer baking-band, of a shorter endless inner baking-band, clearing devices for such bands, and feeding and discharging devices extending within the loop of the outer band, and at right angles to the length thereof, substantially as specified.

24. The combination with an oven, and an endless baking-band, of the wiring of such band, the contact-bars extending parallel to such band, and the contact-brushes, substantially as specified.

25. The combination with an oven, its trackways, and contact-bars, of the endless chains of stove-links, the link conductors, the series of stoves or baking-irons connected to said links, the wiring of said stoves, and the spring-brushes adapted to engage the contact-bars, substantially as specified.

26. In a baking-machine, the combination with an endless feed, of an endless baking-chain, and conducting devices for the application of electricity to said baking-chain, substantially as specified.

27. In a baking-machine, the combination with endless-motion carrying devices of endless-motion feeding devices, and stoves or heaters connected to said carrying devices, and means for heating the same, substantially as specified.

28. The combination with endless sectional baking mechanism, of an endless pneumatic feed, and an automatic discharge, substantially as specified.

29. In a machine for preparing food, the combination with a continuous feed and endless baking-bands moving at right angles to the direction of the feed, or baking the material in sections, means for indenting the material and locking the same together at points to secure compactness with lightness of structure, and means for discharging the baked product upon a conveyer, substantially as specified.

30. A continuous baking-machine, comprising an endless chain of baking-links upon which the material is received, an endless chain of baking-links adapted to cover in the material upon the links of the first chain, means of engagement, whereby the links of the two baking-chains are run in exact relation to each other, and means for heating the baking-chains, substantially as specified.

31. A machine for preparing food, comprising two endless chains of links, and means of engagement between said chains, baking-irons connected to said links and wired for electric heating in connection with brushes of said links, conductor-bars, in contact with which the brushes of the links move, and means for automatically cutting off the electric action where it is unnecessary, substantially as specified.

32. In a machine for preparing food, the combination with moving stoves, of the insulated fine wiring connected thereto, the electric conductors extending parallel to the line of movement of such stoves, and the moving brushes in connection with said wiring and engaging said electric conductors, substantially as specified.

33. The combination with moving stoves, of the conduction devices attached to said stoves, the electric conductors extending parallel to the line of movement of such stoves, the moving brushes in connection with said conduction devices and engaging said electric conductors, and an automatic graduated cut-off for the electric action, substantially as specified.

In testimony whereof I affix my signature in presence of two witnesses.

HENRY D. PERKY.

Witnesses:
   ALBERT H. CHAFFEE,
   J. R. GILKESON.